United States Patent
Tran et al.

(10) Patent No.: US 10,139,521 B2
(45) Date of Patent: *Nov. 27, 2018

(54) SILICONE ELASTOMER-HYDROGEL HYBRID CONTACT LENSES

(71) Applicant: CooperVision International Holding Company, LP, St. Michael (BB)

(72) Inventors: Victoria Tran, San Leandro, CA (US); Rachel Marullo, Oakland, CA (US); Hang Le, San Jose, CA (US); Elissa Irma, San Ramon, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,310

(22) Filed: Mar. 29, 2017

(65) Prior Publication Data

US 2017/0307778 A1 Oct. 26, 2017

Related U.S. Application Data

(60) Provisional application No. 62/325,050, filed on Apr. 20, 2016.

(51) Int. Cl.
*G02B 1/04* (2006.01)
*G02C 7/04* (2006.01)
(Continued)

(52) U.S. Cl.
CPC ........ *G02B 1/043* (2013.01); *B29D 11/00048* (2013.01); *B29D 11/00067* (2013.01);
(Continued)

(58) Field of Classification Search
CPC .......... G02B 1/043; G02B 7/04; G02B 7/022; G02B 7/024; G02B 7/049;
(Continued)

(56) References Cited

U.S. PATENT DOCUMENTS

| 4,099,859 A | 7/1978 | Merrill |
| 8,215,770 B2 | 7/2012 | Blum et al. |

(Continued)

FOREIGN PATENT DOCUMENTS

| WO | 2014194431 A1 | 12/2014 |
| WO | 2016057867 A1 | 4/2016 |
| WO | 2016175950 A1 | 11/2016 |

OTHER PUBLICATIONS

International Search Report and Written Opinion issued in corresponding International Patent Application No. PCT/GB2017/051105 dated Jun. 30, 2017 (11 pages).

(Continued)

*Primary Examiner* — Jordan Schwartz
(74) *Attorney, Agent, or Firm* — Kilyk & Bowersox, P.L.L.C.

(57) ABSTRACT

A silicone elastomer-hydrogel hybrid contact lens includes a silicone elastomer layer and a hydrogel layer adhered to the silicone elastomer layer by a delamination-resistant bond that is formed by an elastomer-swellable monomer that is included in the polymerizable composition used to form the hydrogel layer.

24 Claims, 1 Drawing Sheet

(51) Int. Cl.
*B29D 11/00* (2006.01)
*G02C 7/02* (2006.01)
*B29K 33/00* (2006.01)
*B29K 83/00* (2006.01)
*B29K 105/00* (2006.01)

(52) U.S. Cl.
CPC .. *B29D 11/00125* (2013.01); *B29D 11/00134* (2013.01); *B29D 11/00865* (2013.01); *G02C 7/024* (2013.01); *B29K 2033/12* (2013.01); *B29K 2083/00* (2013.01); *B29K 2105/0061* (2013.01); *G02C 7/04* (2013.01)

(58) Field of Classification Search
CPC ........ B29D 11/00067; B29D 11/00048; B29D 11/00134; G02C 7/04; G02C 7/022; G02C 7/024; G02C 7/049
See application file for complete search history.

(56) References Cited

U.S. PATENT DOCUMENTS

| | | | |
|---|---|---|---|
| 8,298,392 B2 | 10/2012 | Dorairaj et al. | |
| 8,348,424 B2 | 1/2013 | Pugh et al. | |
| 8,865,789 B2 | 10/2014 | Yao et al. | |
| 8,874,182 B2 | 10/2014 | Etzkorn et al. | |
| 8,979,261 B2 | 3/2015 | Goodenough et al. | |
| 9,156,214 B2 | 10/2015 | Norris et al. | |
| 9,176,332 B1 | 11/2015 | Etzkorn et al. | |
| 9,278,489 B2 | 3/2016 | Goodenough et al. | |
| 2002/0016383 A1* | 2/2002 | Iwata ................ | B29D 11/00125 351/159.04 |
| 2008/0208335 A1 | 8/2008 | Blum et al. | |
| 2013/0158211 A1* | 6/2013 | Zhang ................ | C08G 77/388 525/474 |
| 2014/0055741 A1 | 2/2014 | Havenstrite et al. | |
| 2014/0276481 A1 | 9/2014 | Pugh et al. | |
| 2015/0036100 A1 | 2/2015 | Gorne et al. | |
| 2015/0055081 A1* | 2/2015 | de Juan, Jr. ............ | G02C 7/049 351/159.04 |
| 2015/0145155 A1 | 5/2015 | Pugh et al. | |
| 2015/0234204 A1 | 8/2015 | Havenstrite et al. | |
| 2016/0274377 A1* | 9/2016 | Toner ..................... | G02C 7/04 |

OTHER PUBLICATIONS

International Preliminary Report on Patentability issued in corresponding International Patent Application No. PCT/GB2017/051105 dated Apr. 6, 2018 (16 pages).
U.S. Appl. No. 15/472,311, filed Mar. 29, 2017 (39 pages).

* cited by examiner

SILICONE ELASTOMER-HYDROGEL HYBRID CONTACT LENSES

This application claims the benefit under 35 U.S.C. § 119(e) of prior U.S. Provisional Patent Application No. 62/325,050, filed Apr. 20, 2016, which is incorporated in its entirety by reference herein.

FIELD

The field of the invention relates to silicone elastomer-hydrogel hybrid contact lenses and their methods of manufacture.

BACKGROUND

Wearable electronics have received widespread attention in recent years, including electronic contact lenses containing electrical components that provide the lenses with an added functionality. Many applications for electronic contact lenses have been proposed, such as lenses having glucose sensors for diabetic patients (see, for example, U.S. Pat. No. 8,874,182), and lenses containing an electroactive element having a dynamic aperture (see, for example, U.S. Pat. No. 8,215,770). Electronic lenses have potential application for the correction of vision errors, such as myopia control and presbyopia, where a continuous range of focus (i.e. from near distance to far distance) is desired.

Commercially-available contact lenses made from hydrogels are preferred over lenses made from non-hydrogel materials because they are generally more comfortable. Hydrogel contact lenses are typically made by a cast molding process in which a polymerizable composition is dispensed into a contact lens mold and subjected to curing conditions, typically UV light or heat, that cause the monomer mixture to polymerize. The resulting lens is removed from the mold and hydrated to form a hydrogel, which typically comprises from about 20% to 60% water by weight. During the hydration process the lens swells appreciably in size. A non-swelling material, such as electronic components, incorporated into the lens during the curing step can cause uneven swelling of the hydrogel material upon hydration resulting in damaged or distorted lenses that are unsuitable for ophthalmic use.

Additional background publications include U.S. Pat. Pub. No. 2014/0055741, U.S. Pat. Pub. No. 2015/0145155, U.S. Pat. No. 9,176,332, U.S. Pat. Pub. No. 2015/0234204, U.S. Pat. Pub. No. 2015/0036100, U.S. Pat. No. 4,099,859, and PCT Publication No. WO/2014/194431.

SUMMARY

In one aspect, the invention provides a silicone elastomer-hydrogel hybrid contact lens comprising a silicone elastomer layer comprising an anterior side and a posterior side, where a hydrogel layer is adhered to the posterior side of the silicone elastomer layer by a delamination-resistant bond formed by an elastomer-swellable component of the hydrogel layer that interpenetrates into the silicone elastomer layer. The hydrogel layer may be comprised of a silicone hydrogel material or a non-silicone hydrogel material. The hybrid contact lens may comprise an object embedded within the silicone elastomer layer or adhered to the anterior or posterior side of the silicone elastomer layer. In one example, the object is a variable focus lens. In another example, the object is an electronic component.

Another aspect of the invention is a method of manufacturing an elastomer-hydrogel hybrid contact lens. The method comprises contacting a polymerizable hydrogel composition comprising an elastomer-swellable component with a posterior side of a silicone elastomer layer, and curing the hydrogel composition to form a hybrid contact lens comprising a delamination-resistant bond between the silicone elastomer layer and the hydrogel layer. In some examples, the polymerizable composition may additionally comprise a divinyl siloxane and a platinum catalyst.

DETAILED DESCRIPTION

Figure 1A:
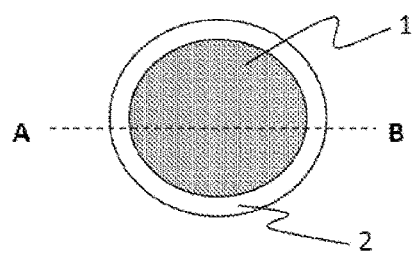
FIG. 1A depicts a topical/planar view of a silicone elastomer-hydrogel hybrid contact lens comprising a circumferential hydrogel skirt.

Disclosed herein is an elastomer-hydrogel hybrid contact lens suitable for housing electronics or other non-swellable components. The contact lens comprises a silicone elastomer layer comprising an anterior side and a posterior side. The term "posterior side" refers to the side of the layer that faces a patient's cornea when the lens is worn. A hydrogel layer comprising at least one elastomer-swellable component is adhered on the posterior side of the silicone elastomer layer and has a surface curvature suitable for corneal placement. The silicone elastomer and hydrogel layer are adhered together by a delamination-resistant bond between the silicone elastomer layer and an elastomer-swellable component of the hydrogel layer that interpenetrates into the silicone elastomer layer. In one example, the entire posterior side of the silicone elastomer layer is adhered to the hydrogel layer. In another example, a portion of the posterior side of the silicone elastomer layer is adhered to the hydrogel layer.

Silicone elastomers, which are also referred to in the art as silicone rubbers, are materials based on polyorganosiloxanes, such as, for example, polydimethylsiloxanes (PDMS). The silicone elastomer layer may consist of, or consist essentially of, a cured silicone elastomer. For example, the silicone elastomer layer may be free of any polymeric component other than the polyorganosiloxanes. In some examples the silicone elastomer layer may contain an additive such as a tint, a UV filter, or a lubricity enhancing agent. The silicone elastomer layer typically has a water content less than 1 wt. %. In some examples, the silicone elastomer layer has a water content less than 0.5 wt. %, or less than 0.3 wt. %. The silicone elastomer layer has adequate optical clarity for use as a component in a contact lens. In some examples, light transmittance across the range of 500 nm to 780 nm, or 381 nm to 780 nm, is at least 80%, 85%, 90%, 95% or 97% (measured in accordance with ISO 18369). In one example, the silicone elastomer layer has a Young's modulus of at least 0.3 or 0.5 MPa up to about 1.5 or 2.0 MPa, as measured by an ANSI Z80.20 standard using an Instron Model 3342 or Model 3343 mechanical testing system, or equivalent. Throughout this disclosure a reference to "an example" or "a specific example" or similar phrase, is intended to introduce a feature or features of the hybrid contact lens, or component of the hybrid contact lens, or method of manufacture (depending on context) that can be combined with any combination of previously-described or subsequently-described examples (i.e. features), unless a particular combination of features is mutually exclusive, or if context indicates otherwise. Suitable silicone elastomers for fabricating the silicone elastomer layer include MED 6015, MED 6755 and MED 6033, from NuSil Technology, and SYLGARD elastomers from Dow Corning. The silicone elastomer formulations may be cured in accordance with the manufacturer's recommendations.

The silicone elastomer layer may have any dimensions and shape suitable for its intended purpose. Thus, as used herein, the term "layer" is not restricted to any particular dimensions or shape. In one example the silicone elastomer layer is lens-shaped, meaning that it has a posterior (i.e. back) side with a concave curvature corresponding to the curvature of a patient's cornea and an anterior (i.e. front) side with a convex curvature. In another example, the silicone elastomer layer has a posterior side that is flat. In yet another example, the silicone elastomer layer has a curvature that is shallower than the curvature of the cornea. The silicone elastomer layer may be shaped using any suitable method such as cast molding, injection molding, or lathing.

The hydrogel layer may be a silicone hydrogel material or a non-silicone hydrogel material, and is formed by curing a polymerizable composition comprising one or more hydrophilic monomers. A silicone hydrogel is formed by curing a polymerizable composition comprising at least one siloxane monomer and at least one hydrophilic monomer. A "siloxane monomer" contains at least one Si—O group. Polymerizable compositions and methods for forming silicone hydrogel contact lenses are well known in the art (e.g. U.S. Pat. No. 8,865,789). A silicone-free hydrogel, also known in the field as a "conventional hydrogel" comprises at least one hydrophilic monomer, and no siloxane monomers. The term "monomer", as used herein, refers to any molecule comprising at least one polymerizable group (e.g. vinyl group, acrylate group, methacrylate group, etc.) capable of reacting with other molecules that are the same or different, to form a polymer or copolymer. Thus, the term encompasses polymerizable pre-polymers and macromonomers, there being no size-constraint of the monomer unless indicated otherwise. A cross-linking agent is a monomer having two or more polymerizable groups. As used herein, a "vinyl-containing" monomer is any monomer that has a polymerizable carbon-carbon double bond (i.e., a vinyl group) present in its molecular structure, where the carbon-carbon double bond of the vinyl group is less reactive than the carbon-carbon double bond present in an acrylate or a methacrylate polymerizable group under free radical polymerization. Thus, while a carbon-carbon double bond is present in acrylate groups and methacrylate groups, as used herein, such groups are not considered to be "vinyl groups". Thus, for example, of the monomers described below in the examples section, only the monomer of Structure VIII is considered to be a vinyl-containing monomer.

At least one of the monomers of the polymerizable composition for the hydrogel layer is an "elastomer-swellable component", which, as used herein, refers to a monomer that is capable of swelling the silicone elastomer used to form the silicone elastomer layer. Whether a given monomer is capable of swelling the silicone elastomer is determined by immersing an 11.5 mm×100 μm disk consisting of the cured silicone elastomer in the uncured liquid monomer at room temperature (20-25° C.) for 24 hours. At 24 hours, the disk is removed from the liquid monomer and its diameter is measured. The percent change in diameter is calculated by the equation $((D_{final}-11.5)/11.5)*100$, where $D_{final}$ is the diameter of the disk measured in mm at 24 hours. In specific examples, the elastomer-swellable component is capable of swelling a disk consisting of the silicone elastomer by at least 5%, 10%, or 15% up to about 25%, 30%, or 35%. Throughout this disclosure, when a series of lower limit ranges and a series of upper limit ranges are provided, all combinations of the provided ranges are contemplated as if each combination were specifically listed. For example, in the above listing of % swell, all nine possible ranges of % swell are contemplated (i.e. 5% to 25%, 5% to 30% . . . 15% to 30%, and 15% to 35%). Also, throughout this disclosure, when a series of values is presented with a qualifier preceding the first value, the qualifier is intended to implicitly precede each value in the series unless context dictates otherwise. For example, for the values listed above, it is intended that the qualifier "from about" implicitly precedes both 10% and 15%, and the qualifier "to about" implicitly precedes both 30% and 35%.

In some examples, the elastomer-swellable component has a hydrophilic-lipophilic balance (HLB) value of up to 4, or a molecular weight of up to 1,200 daltons (Da), or both an HLB value of up to 4 and a molecular weight of up to 1,200 Da. The HLB value of a monomer is calculated using the formula: $HLB=(20*MW_h)/MW_t$, where $MW_h$ is the molecular weight of the hydrophilic portion of the monomer, and $MW_t$ is the total molecular weight of the monomer. A monomer that has no hydrophilic portion has an HLB value of 0. A monomer may have more than one hydrophilic portion, in which case the molecular weight of each hydrophilic portion is added together in the HLB calculation. For example, in the monomer of Structure III below, referred to as FMM, the hydrophilic portions of the molecule are —OCH$_2$CH$_2$N— and —OCH$_2$CH$_2$O—, which have a combined molecular weight of 119 Da, and the total molecular weight of FMM is 1324 Da. Therefore, the HLB value of FMM is calculated as (20*119)/1324=1.8. In a specific example, the elastomer-swellable component has an HLB value of 0 to 3. In a further example, the elastomer-swellable component has a total molecular weight of less than 1,000, or less than 750. In the case of a polydisperse monomer, such as with some macromonomers, the term "molecular weight" refers to the absolute number average molecular weight of the monomer as determined by $^1$H NMR end-group analysis (NMR).

Exemplary elastomer-swellable siloxane monomers are described below in Example 3. In one example, the elastomer-swellable siloxane monomer comprises a single polymerizable group (i.e. it is monofunctional). In another example, the siloxane monomer comprises two or more polymerizable groups. In such example, the siloxane monomer functions as a cross-linking agent, which may strengthen the bond between the silicone elastomer layer and the hydrogel layer, thereby increasing delamination-resistance. Exemplary cross-linkable siloxane monomers include methacryloxypropyl terminated polydimethylsiloxanes, acryloxypropyl terminated polydimethylsiloxanes, vinyl terminated polydimethylsiloxanes, and polydimethylsiloxanes having two different types of polymerizable groups, such as methacryloxypropyl-terminated and vinyl-terminated polydimethylsiloxane.

An exemplary elastomer-swellable siloxane-free monomer is methyl methacrylate (MMA). Other low molecular weight hydrophobic monomers used in conventional hydrogel formulations, such as isobutyl methacrylate and pentyl methacrylate, may function as the elastomer-swellable component. In a specific example, the hydrogel layer comprises a polymerization product (i.e. a copolymer) of 2-hydroxyethyl methacrylate (HEMA) and MMA. In a further specific example, the hydrogel layer comprises a polymerization product of HEMA and at least 10 wt. %, 20 wt. % or 30 wt. % MMA. As used herein, reference to a polymerization product or copolymer of two specific monomers is intended to encompass copolymers formed from copolymerization of the two specific monomers and one or more additional undisclosed monomer.

It is believed that during formation of the hydrogel layer, the elastomer-swellable component interpenetrates into the silicone elastomer layer and forms a delamination-resistant bond between the silicone elastomer layer and the hydrogel layer. In one example, the bond comprises an interpenetrating polymer network (IPN) in which, during the formation of the hydrogel, the elastomer-swellable component polymerizes around the silicone elastomer to form a polymer network that is interlocked with the silicone elastomer. In another example, the bond comprises a covalent bond between the elastomer-swellable component and the silicone elastomer. In some examples, the delamination-resistant bond between the silicone elastomer layer and the hydrogel layer comprises both an IPN and a covalent bond between the elastomer-swellable component and the silicone elastomer. By the term "delamination-resistant", it is meant that the silicone elastomer layer and the hydrogel layer remain adhered to each other after autoclaving at 121-124° C. for 30 minutes.

Figure 1B:
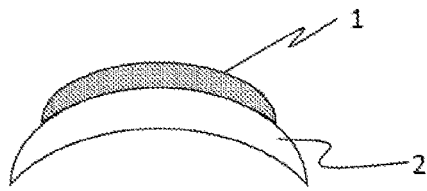
FIG. 1B depicts a cross-sectional side view of the contact lens of FIG. 1A through the sectional line A-B.
Figure 5:
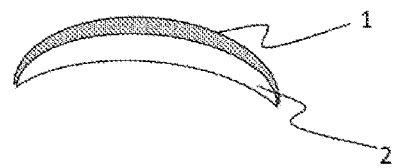
FIG. 5 depicts an example of a silicone elastomer-hydrogel hybrid contact lens where the silicone elastomer layer and the hydrogel layer have about the same diameters.

The hydrogel layer of the hybrid contact lens has dimensions and properties suitable for contact with a human cornea, i.e. it is ophthalmically-acceptable. Referring to FIGS. 1A and 1B, in one example, the hydrogel layer (2) of the hybrid contact lens has a chord diameter that is larger than the chord diameter of the silicone elastomer layer (1), thereby forming a circumferential skirt (i.e. annulus) of hydrogel material around the periphery of the silicone elastomer layer. In one example, the chord diameter of the hydrogel layer is about 1.0 mm, 2.0 mm, or 3.0 mm up to about 0.6 mm, 7.0 mm or 8.0 mm larger than the cord diameter of the silicone elastomer layer. In another example, referring to FIG. 5, the silicone elastomer layer (1) and the hydrogel layer (2) have the same, or approximately the same, chord diameters. The hydrogel layer has a posterior surface curvature suitable for corneal placement. The hydrogel layer is sufficiently thick to provide a biocompatible hybrid contact lens having adequate movement and comfort when worn by a patient. Adequate lens movement can be determined by slit lamp evaluation using a standard Push-Up test. In one example, the hybrid contact lens has a Push-Up test grade of about 35% or 40% up to about 60% or 65%. In one example, the hydrogel layer has a center thickness of at least about 5 µm, 10 µm, or 25 µm up to about 50 µm, 75 µm or 100 µm. As used herein, center thickness refers to the cross-sectional thickness of the center of the hydrogel layer when fully hydrated, as measured using a Rehder Model ET-3 electronic thickness gauge or equivalent thickness gauge instrument. The thickness of the hydrogel layer may be uniform throughout the layer or it may be non-uniform, for example, it may taper towards the periphery of the lens. The hybrid contact lens has the appropriate refractive correction for the wearer, and may be a spheric lens, a toric lens, or a multifocal lens. The refractive index, curvature, and thickness of the hybrid lens may be contributed to by any layer of the lens.

The hydrogel layer may have an equilibrium water content (EWC) of at least about 10 wt. %, 20 wt. %, or 30 wt. %, and up to about 40 wt. %, 50 wt. %, or 60 wt. %. To measure EWC, excess surface water is wiped off of a fully hydrated hydrogel layer (i.e. not bonded to the silicone elastomer layer) and the hydrogel layer is weighed to obtain the hydrated weight. The hydrogel layer is dried in an oven at 80° C. under a vacuum, and weighed. The weight difference is determined by subtracting the weight of the dry hydrogel layer from the weight of the hydrated layer. The wt. % EWC of the hydrogel layer is =(weight difference/hydrated weight)×100.

Figure 2:
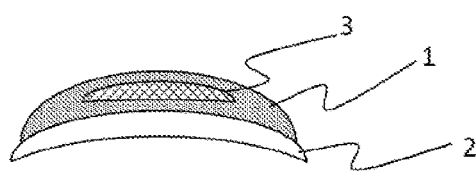
FIG. 2 depicts an example of a silicone elastomer-hydrogel hybrid contact lens comprising a variable focus lens embedded within the silicone elastomer layer.
Figure 3:
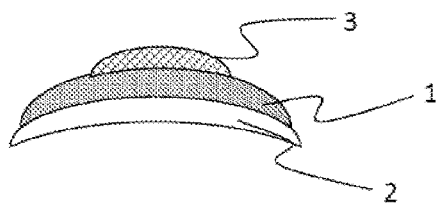
FIG. 3 depicts an example of a silicone elastomer-hydrogel hybrid contact lens comprising a variable focus lens adhered to the anterior side of the silicone elastomer layer.
Figure 6:
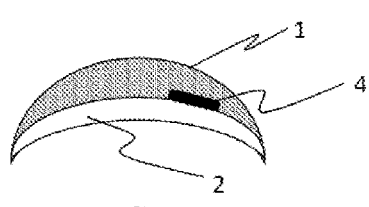
FIG. 6 depicts an example of a silicone elastomer-hydrogel hybrid contact lens where the silicone elastomer layer has an electronic component adhered to its posterior side.
Figure 7:
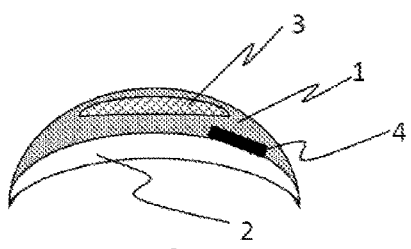
FIG. 7 depicts an example of a silicone elastomer-hydrogel hybrid contact lens where the silicone elastomer layer has an embedded variable focus lens and an electronic component adhered to its posterior side.

The silicone elastomer-hydrogel hybrid contact lens may further comprise an object embedded within the silicone elastomer layer or adhered to the anterior or posterior side of the silicone elastomer layer. In one example, the object may be a variable focus optical lens such as a liquid meniscus lens (see e.g. U.S. Pat. No. 8,348,424), an electro-wetting lens, a liquid crystal lens, or an electro-active lens (see e.g. US 2008/0208335). Other objects that may be embedded within a silicone elastomer layer or adhered to the anterior surface of the silicone elastomer layer include electrodes, batteries, antennae, circuits, MEM devices, sensors, etc. An object may be embedded within the silicone elastomer layer by immersing the object within the liquid (i.e. uncured) silicone elastomer and then curing the elastomer to its desired shape, for example by cast molding. For example, as depicted in FIG. 2, the silicone elastomer-hydrogel hybrid contact lens may comprise a hydrogel layer (1), a silicone elastomer layer (2), and an object, such as a variable focus lens (3), embedded within the silicone elastomer layer. In another example, an object may be adhered to or partially embedded in the anterior surface of the silicone elastomer layer by a mold transfer method, or by gluing the object onto the silicone elastomer after it has been cured. In one such example, the silicone elastomer-hydrogel hybrid lens may have the configuration depicted in FIG. 3, in which a variable focus lens (3) is adhered to the anterior side of the silicone elastomer layer (2). As used herein, the phrase "partially embedded within" is intended to mean that the object is not fully embedded within the silicone elastomer layer as depicted in FIG. 2. For example, FIG. 6 depicts an electronic component (4) that is partially embedded by the silicone elastomer layer (1). FIG. 6 illustrates that the entire posterior side of the silicone elastomer layer need not be adhered to the hydrogel layer, and that just a portion of the posterior side of the silicone elastomer layer may be adhered to the hydrogel layer by a delamination resistant bond. In some examples, the silicone elastomer-hydrogel hybrid contact lens comprises at least one objected embedded within the silicone elastomer layer and at least one object adhered to the anterior or posterior side of the silicone elastomer layer. One such example is depicted in FIG. 7.

The silicone elastomer-hydrogel hybrid contact lens described herein may be manufactured using methods well-known in the art. In a general aspect, one method comprises contacting a polymerizable hydrogel composition comprising an elastomer-swellable component with a posterior side of a silicone elastomer layer and curing the hydrogel composition to form a delamination-resistant bond between the silicone elastomer layer and the hydrogel layer. The method may further comprise hydrating the hydrogel layer, and packaging the silicone elastomer-hydrogel contact lens.

The silicone elastomer layer may be formed into the desired shape by any suitable method, such as cast molding, spin casting, solvent casting, thermoforming, injection molding, or lathing. In one example, the silicone elastomer layer is formed by a cast molding method in which an amount of a liquid silicone elastomer is dispensed into a first mold member defining the anterior surface of the silicone elastomer layer. A second mold member defining the posterior surface of the silicone elastomer is coupled to the first mold member to form a first mold assembly, which is subjected to conditions that cause the silicone elastomer to cure (e.g. thermal curing, UV curing, etc.). In a specific example, the mold halves are decoupled (i.e. separated) so that the silicone elastomer layer is retained by the first mold member. This may be achieved by using first and second mold members having different surface properties that promote adherence of the silicone elastomer layer to the first mold member. For example, the first mold member may have a molding surface that is more polar than the molding surface of the second mold member. In a specific example, the first and second mold members are formed from polypropylene and the molding surface of the first mold member is treated with oxygen plasma to make it more polar than the molding surface of the second mold member. In other examples, the first and second mold members may be made from different materials having different polarities.

Figure 4:
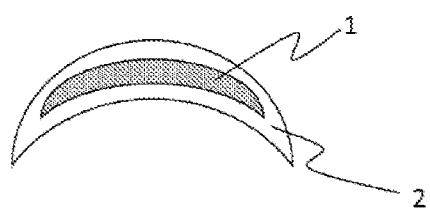
FIG. 4 depicts an example of a silicone elastomer-hydrogel hybrid contact lens where a hydrogel layer is adhered to both the anterior and posterior sides of the elastomer layer.

After the silicone elastomer layer has cured, a polymerizable hydrogel composition comprising an elastomer-swellable component is dispensed onto the posterior side of the silicone elastomer layer and cured. In one example, the silicone elastomer layer remains adhered to the first mold member when the hydrogel layer is dispensed onto the silicone elastomer layer. Then, a third mold member, referred to as the "male mold member", which defines the posterior surface of the hydrogel layer, is coupled to the first mold member to form a second mold assembly. The second mold assembly is subjected to conditions under which the polymerizable hydrogel composition cures to form a hydrogel layer comprising a delamination-resistant bond between the silicone elastomer layer and the hydrogel layer. In another example, the silicone elastomer layer is removed from the first mold assembly, placed into a female contact lens mold member, and the polymerizable hydrogel composition is dispensed on the silicone elastomer layer in the female contact lens mold member. A male mold member is coupled to the female mold member to form a mold assembly that is subjected to conditions that cause the polymerizable hydrogel composition to cure (e.g. thermal curing, UV curing, etc.). In this example, the silicone elastomer layer may be positioned within the mold assembly such that the hydrogel layer forms around and fully envelopes the silicone elastomer layer, such that the resulting elastomer-hydrogel hybrid contact lens may be considered to comprise a hydrogel layer adhered to both the anterior side and posterior side of the silicone elastomer layer, as depicted in FIG. 4. In other examples, the hydrogel layer may be formed by spray coating or dip-coating the silicone elastomer layer with the polymerizable hydrogel composition, curing the hydrogel, and optionally lathing the hydrogel layer to the desired shape.

As described above, one or more elastomer-swellable components of the polymerizable hydrogel composition interpenetrates into the silicone elastomer layer to form an interpenetrating polymer network resulting in a delamination-resistant bond. In some examples, the delamination-resistant bond may also comprise covalent attachment. Covalent attachment between the silicone elastomer layer and the hydrogel layer may be achieved by including a platinum catalyst and an elastomer-swellable vinyl-containing cross-linking agent in the polymerizable hydrogel composition. In one example, the elastomer-swellable vinyl-containing cross-linking agent is a divinyl siloxane. In a specific example, the divinyl siloxane is a divinyl-functionalized PDMS. In other examples, the elastomer-swellable vinyl-containing cross-linking agent may comprise a single vinyl group and a different (i.e. non-vinyl) polymerizable group, such as an acrylate or a methacrylate group.

After the hydrogel layer has cured, the hybrid contact lens may optionally be washed to extract unreacted or partially reacted ingredients from the hydrogel layer and to hydrate the hydrogel layer. Extraction and hydration methods for hydrogel contact lenses are known in the art (see e.g. U.S. Pat. No. 8,865,789). Unlike the hydrogel layer, the elastomer layer of the hybrid contact lens does not swell appreciably in water. In some cases, the differential swell between the hydrogel layer and the elastomer layer of the hybrid contact lens may cause significant distortion, and even delamination. The possibility of this occurring may be reduced by forming a hydrogel layer that has a relatively low percent swell. As used herein, the "percent swell" of a hydrogel layer is determined by the formula: $(D_w-D_d/D_w) \times 100$, where $D_d$ is the chord diameter of a dry (unwashed)+1.0 diopter contact lens consisting of the cured polymerizable hydrogel composition (i.e. the cured hydrogel is not bonded to the silicone elastomer layer), and $D_w$ is the chord diameter of the +1.0 diopter contact lens after it has been washed and hydrated. In various examples, the hydrogel layer has a swell of about −5% or 0% up to about 10% or 15% or 20%.

The percent swell of a hydrogel layer may be varied by varying the amount of cross-linking agents included in the composition. Increasing the amount of cross-linking agents generally decreases the percent swell of the hydrogel layer. The percent swell of a hydrogel may also be decreased by the inclusion of a diluent in the polymerizable composition. As used herein, the term "diluent" refers to a non-reactive ingredient of the polymerizable composition that can be washed out of the hydrogel after it has been cured. In one example, the hydrogel layer comprises a silicone hydrogel and the polymerizable hydrogel composition comprises a silicone-containing diluent. In a specific example, the silicone-containing diluent is a PDMS polymer or a PDMS-containing copolymer. In a further specific example, the silicone-containing diluent is a copolymer of PDMS and polyethylene glycol (i.e. PDMS-co-PEG).

In some examples, it may be unnecessary to wash the hydrogel layer prior to use by an end consumer. In such examples, the silicone elastomer-hydrogel hybrid contact lens may be packaged in the unhydrated state (dry) and the end-consumer may hydrate the hydrogel layer immediately prior to use by wetting the lens with an artificial tear solution. This can be advantageous in examples where the hybrid contact lens comprises a functional component, such as electronic components, that could become nonoperational if immersed in a saline solution for an extended period. In other examples, the hydrogel layer may be washed to remove unreacted materials and then dried prior to final packaging of the hybrid contact lens. In yet other examples, the hydrogel layer is washed and the hybrid contact lens is packaged with the hydrogel layer in a hydrated state.

Prior to packaging, the hybrid contact lens may be subjected to further processing. For example, in embodiments where the silicone elastomer layer forms the anterior surface of the contact lens, it may be subjected to a treatment that makes the anterior surface hydrophilic. For example, the silicone elastomer layer may be treated with plasma or coated with a hydrophilic coating to make the anterior surface of the contact lens more wettable. In some examples, the hydrogel layer may also include a surface treatment, such as a plasma treatment or a surface coating, if desired.

The hybrid contact lens may be placed into any suitable container, such as a blister package, glass vial, or other appropriate container, all referred to herein as "packages". A packaging solution, such as a phosphate- or borate-buffered saline, may be optionally added to the container if the hybrid lens is to be packaged with the hydrogel layer in its hydrated state. The package is sealed, and the sealed hybrid contact lens is sterilized by sterilizing amounts of radiation, including heat or steam, such as by autoclaving, gamma radiation, e-beam radiation, ultraviolet radiation, etc. The final product is a sterile, packaged ophthalmically-acceptable silicone elastomer-hydrogel hybrid contact lens.

The following Examples illustrate certain aspects and advantages of the present invention, which should be understood not to be limited thereby.

Example 1: Double-Casting Method to Form Hydrogel and Silicone Elastomer Hybrid Contact Lenses About 95 uL silicone elastomer (MED-6015, NuSil) was dispensed into oxygen plasma-treated female polypropylene contact lens mold members. A male mold member made from un-treated polypropylene was fitted on top of each female mold to provide a first mold assembly that was placed in an oven at a temperature set at 100° C. for 40 minutes. Upon opening the mold assemblies, the partially-cured elastomer lenses remained attached to the female mold members. Next, about 95 uL of a polymerizable composition was dispensed into each female mold member on top of the elastomer lens. The polymerizable compositions used were the same compositions that are used to form stenfilcon A, enfilcon A, comfilcon A and ocufilcon. A male mold member was placed in contact with each of the female mold members containing the cured elastomer and the polymerizable composition to form a second mold assembly. The mold assemblies were cured using heat or ultraviolet light, as required by each of the different polymerizable compositions. After curing, the hybrid lenses were removed from the molds and subjected to extraction and hydration. Lenses that withstood extraction and hydration were packaged and autoclaved. Only stenfilcon A lenses withstood the extraction, hydration and autoclave.

Example 2: Swellability of Silicone Elastomer in Hydrogel Polymerizable Compositions We hypothesized that the stenfilcon A polymerizable composition penetrated into and formed an interpenetrating polymer network with the silicone elastomer during curing, thereby forming a bond between the silicone hydrogel layer and the silicone elastomer layer, which prevented the two layers from delaminating during extraction and hydration. To test whether stenfilcon A penetrates into silicone elastomer significantly more than the other hydrogel polymerizable compositions from Example 1, we immersed an 11.5 mm (diameter)×100 μm disk made from cured MED6015 into each of the polymerizable compositions at room temperature until swelling of the disk was complete (15 minutes up to 24 hour). The change in disk diameter was measured and the percent swell was calculated as the percent increase in diameter. The results, shown in Table 1, indicate that the stenfilcon A polymerizable composition swelled the MED6015 appreciably more than the other polymerizable compositions.

TABLE 1

| MED6015 Swell In Lens Monomer Mixes | |
|---|---|
| Polymerizable Composition | % Swell |
| Stenfilcon A | 8% |
| Enfilcon A | 3% |
| Comfilcon A | 4% |
| Ocufilcon | 0% |

Example 3: Swellability of Silicone Elastomer in Hydrogel Monomers

We further tested whether each individual monomer from the stenfilcon A polymerizable composition could penetrate into MED6015 disks using the same method described in Example 2. Ethanol and ethyl acetate were also included. Ethanol is known to not swell MED6015 significantly, while ethyl acetate is a good solvent for silicone elastomers. The results are shown in Table 2. X22-1622 refers to a siloxane monomer of structure I:

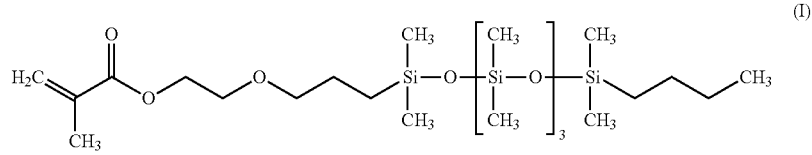

X22-1640 refers to a siloxane monomer of structure II, in which m=5-6, n=80-90, and p=7-8

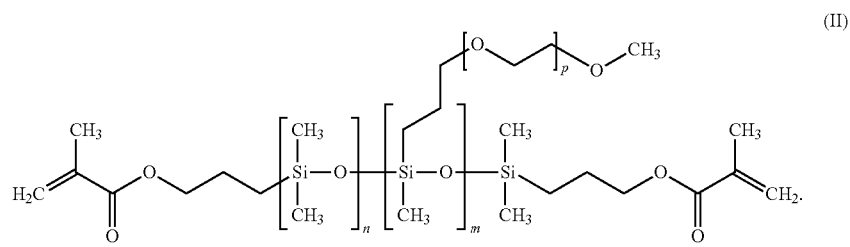

TABLE 2

MED6015 Swell In Liquid Monomers

| Liquid Monomer | % Swell |
|---|---|
| X22-1622 | 23% |
| X22-1640 | 1% |
| N-vinyl-N-methylacetamide (VMA) | 0% |
| Methyl methacrylate (MMA) | 21% |
| Ethanol | 2% |
| Ethyl acetate | 24% |

Example 4: Swellability of Silicone Elastomer in Siloxane Monomers

We tested the ability of additional siloxane monomers to penetrate into MED6015 disks using the same method described in Example 2. The % changes in diameter of the MED6015 disks are shown in Table 3, along with the average molecular weight and approximate HLB value of each monomer. The molecular structure of each monomer tested is provided below the table, except for the structures of X22-1622 and X22-1640, which are provided above.

TABLE 3

MED6015 Swell In Siloxane monomers

| Siloxane monomer | % Change in Diameter | MW Wt. | HLB Value | Structure No. |
|---|---|---|---|---|
| X22-1622 | 23% | 585 | 2.1 | I |
| X22-1640 | 1% | 8000-11000 | 0.7 | II |
| FMM | 4% | 1324 | 1.8 | III |
| TRIS | 28% | 423 | 0 | IV |
| SiGMA | 3% | 436 | 4.1 | V |
| MCS-M11 | 22% | 800-1200 | 0 | VI |
| MCR-M07 | 24% | 600-800 | 0 | VII |
| MCR-M11 | 19% | 800-1000 | 0 | VII |
| DMS-500 | 33% | 500 | 0 | VIII |
| DMS-700 | 25% | 700 | 0 | VIII |

The molecular structures of each of the siloxane monomers listed in Table 3 other than X22-1640 and X22-1662, which were previously provided, are as follows:

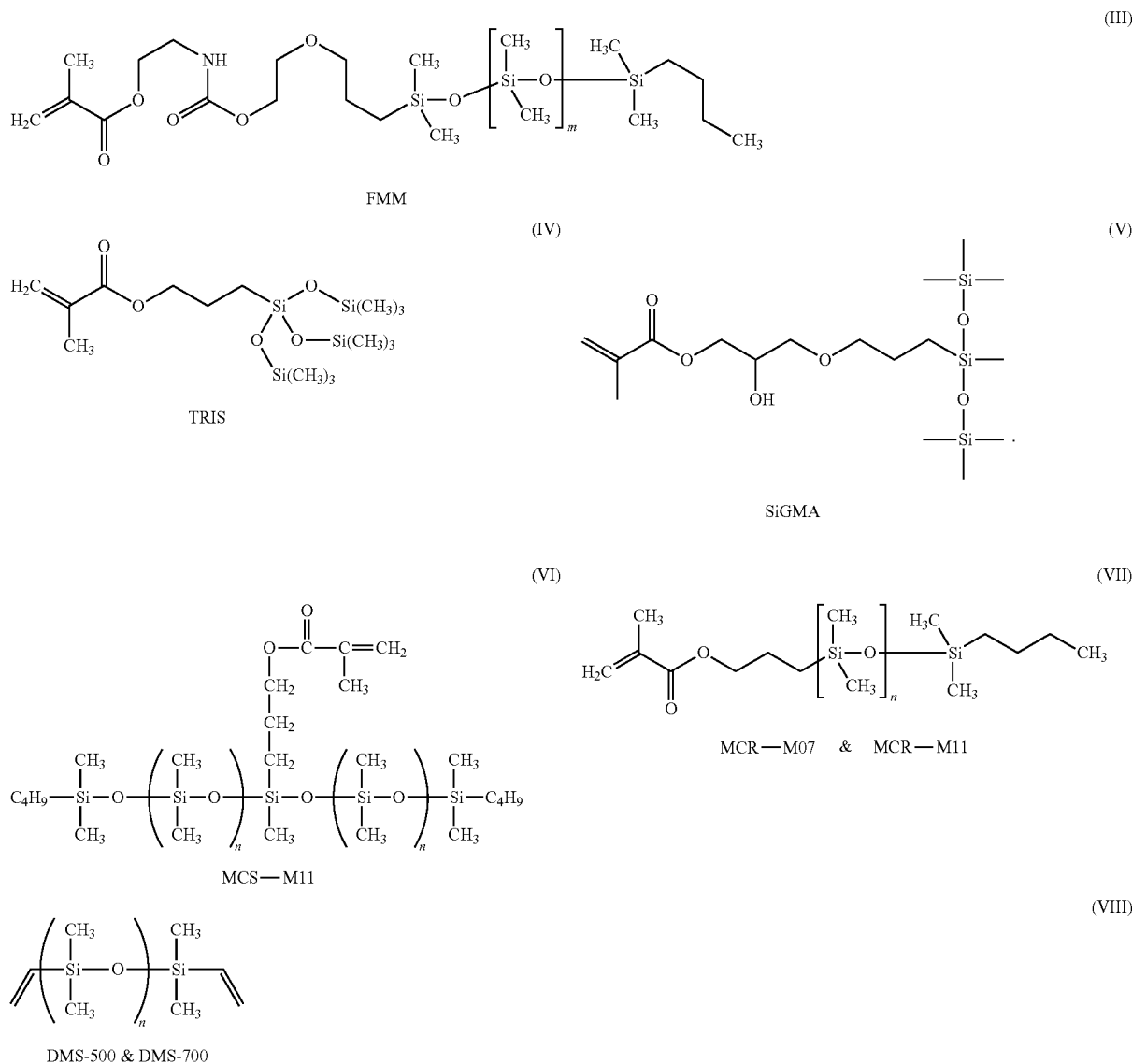

Example 5: Cross-Linking of Silicone Elastomer with Silicone Hydrogel

As indicated in Example 1, the polymerizable composition for Comfilcon A when double-casted on a silicone elastomer (MED6015) did not yield delamination-resistant hybrid contact lenses. We were, however, able to achieve a delamination-resistant bond between the silicone elastomer layer and the hydrogel layer using the double-casting method described in Example 1, with the exception that the hydrogel was thermally cured instead of UV-cured, by adding to the comfilcon A polymerizable composition a vinyl terminated poly divinyl dimethyl siloxane (DMS-700), a platinum catalyst (Pt(II)), a thermal initiator (Vazo) and a vinyl-functionalized cross-linking agent (tetrakis dimethylsiloxy silane (TDSS)). Column 1 of Table 4 below shows the additional components and amounts (in % by weight of total polymerizable composition) added to the comfilcon A composition. Whether a delamination-resistant bond formed between the hydrogel layer and silicone elastomer layer is indicated in columns 2 and 3 of Table 4.

TABLE 4

| | Number of delaminated lenses | |
|---|---|---|
| Added Components | after hydration in water | after extraction with EtOH |
| 1.5% Vazo | 1 of 15 | 15 of 15 |
| 10% DMS-700, 1.5% Vazo | 0 o 16 | 16 of 16 |
| 20% DMS-700, 1.5% Vazo | 3 of 16 | 16 or 16 |
| 10% DMS-700, 1.5% Vazo, Pt(II) & 0.09% TDSS | 1 of 8 | 1 of 8 |
| 20% DMS-700, 1.5% Vazo, Pt(II) & 0.09% TDSS | 8 of 12 | 8 of 12 |

Example 6: Double-Casting Method to Form HEMA-MMA Hydrogel and Silicone Elastomer Hybrid Contact Lenses Siloxane-free hydrogel polymerizable compositions with varying methyl methacrylate (MMA) and 2-hydroxy-ethyl methacrylate (HEMA) were made and tested for bonding to silicone elastomer. The formulation consisted of 0.4 parts ethylene glycol dimethacrylate (EGDMA), 0.5 parts 2,2'-Azobis(2-methylpropanenitrile) (VAZO-64), and the amounts of MMA and HEMA shown in Table 5.

MED6015 lenses were formed by curing in an oven at a temperature of 100° C. for 40 minutes in polypropylene mold assemblies suitable for forming −1.0 D contact lenses. The female mold half was pretreated with plasma to promote adherence of the cured MED6015 to the female mold half upon demolding. The siloxane-free hydrogel polymerizable compositions were dispensed onto the MED6015 lens in the female mold half, and closed with a polypropylene male mold half suitable for forming a +6.0 D contact lens. The lenses were cured for 1 hour in an oven at a temperature of 100° C.

After curing, the mold assemblies were opened and dosed with water to soften the HEMA coating. The lenses were stressed with brief ethanol extraction, hydration, autoclaving and rubbing. The results, summarized below in Table 5, show that delamination was prevented by adding 20% or more MMA to the formulation.

TABLE 5

| parts MMA | parts HEMA | # delaminated lenses | Overall yield |
|---|---|---|---|
| 0 | 99.1 | 4/9 | 38% |
| 10 | 89.1 | 3/7 | 36% |
| 20 | 79.1 | 0 | 100% |
| 30 | 69.1 | 0 | 100% |
| 60 | 39.1 | 0 | 100% |

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The present invention includes the following aspects/embodiments/features in any order and/or in any combination:

1. A silicone elastomer-hydrogel hybrid contact lens comprising a silicone elastomer layer comprising an anterior side and a posterior side; and a hydrogel layer adhered to the posterior side of the silicone elastomer layer, wherein a delamination-resistant bond formed by an elastomer-swellable component of the hydrogel layer that interpenetrates into the silicone elastomer layer is present between the silicone elastomer layer and the hydrogel layer.
2. The hybrid contact lens of 1, wherein the elastomer-swellable component is capable of swelling a disk consisting of the silicone elastomer by at least 5% or, 10%.
3. The hybrid contact lens of 1 or 2, wherein the elastomer-swellable component has an HLB value of less than 4, or less than 3, or less than 2, or less than 1, or 0.
4. The hybrid contact lens of any one of 1 to 3, wherein the elastomer-swellable component has a molecular weight of less than 1,200 daltons, or less than 1,000 daltons, or less than 700 daltons.
5. The hybrid contact lens of any one of 1 to 4, wherein the hydrogel layer is a silicone hydrogel.
6. The hybrid contact lens of any one of 1 to 4, wherein the hydrogel layer is a siloxane-free hydrogel.
7. The hybrid contact lens of 6, wherein the hydrogel layer comprises a copolymer of 2-hydroxyethyl methacrylate (HEMA) and methyl methacrylate (MMA).
8. The hybrid contact lens of 7, wherein the copolymer is formed by curing a polymerization composition comprising at least 10 wt. % MMA, or at least 20 wt. % MMA, or at least 30 wt. % MMA
9. The hybrid contact lens of any one of 1 to 8, wherein the bond comprises an interpenetrating polymer network formed by the elastomer-swellable component.
10. The hybrid contact lens of any one of 1 to 9, wherein the bond comprises a covalent attachment between a vinyl-functionalized component of the hydrogel layer and the silicone elastomer layer.

11. The hybrid contact lens of any one of 1 to 5, wherein the bond comprises a covalent attachment between a vinyl-functionalized component of the hydrogel layer and the silicone elastomer layer, and wherein the vinyl-functionalized component comprises a divinyl siloxane.

12. The hybrid contact lens of any one of 1 to 11, wherein the hydrogel layer forms a circumferential skirt around the silicone elastomer layer.

13. The hybrid contact lens of any one of 1 to 12, wherein the silicone elastomer layer forms the anterior surface of the contact lens and is treated, such as with plasma or a hydrophilic coating, to provide a hydrophilic surface.

14. The hybrid contact lens of any one of 1 to 13, further comprising an object embedded within the silicone elastomer layer or adhered to the anterior or posterior side of the silicone elastomer layer.

15. The hybrid contact lens of 14, wherein the object is a variable focus lens or an electronic component.

16. A method of manufacturing an elastomer-hydrogel hybrid contact lens comprising: contacting a polymerizable hydrogel composition comprising an elastomer-swellable component with a posterior side of a silicone elastomer layer; and curing the hydrogel composition to form a hybrid contact lens comprising a delamination-resistant bond between the silicone elastomer layer and the hydrogel layer.

17. The method of 16, further comprising hydrating the hydrogel layer.

18. The method of 16 or 17, further comprising sealing the hybrid contact lens in a package.

19. The method of any one of 16 to 18, wherein the polymerizable composition comprises a divinyl siloxane and a platinum catalyst.

20. The method of any one of 16 to 18, wherein the silicone elastomer layer is formed by a method comprising: dispensing an amount of a liquid silicone elastomer into a first mold member defining an anterior surface of the silicone elastomer layer; coupling a second mold member defining a posterior surface of the silicone elastomer to the first mold member to form a first mold assembly; and subjecting the first mold assembly to conditions that cause the silicone elastomer to cure.

21. The method of 20, further comprising:
decoupling the first and second mold members so that the silicone elastomer layer is retained by the first mold member, wherein the polymerizable hydrogel composition is contacted with the posterior side of the silicone elastomer layer while it is retained by the first mold member, and wherein a third mold member defining a posterior surface of the hydrogel layer is coupled to the first mold member to form a second mold assembly.

What is claimed is:

1. A silicone elastomer-hydrogel hybrid contact lens comprising:
    a) a silicone elastomer layer comprising an anterior side and a posterior side; and
    b) a hydrogel layer adhered to the posterior side of the silicone elastomer layer, wherein the hydrogel layer is formed by curing a polymerizable composition comprising an elastomer-swellable monomer having an HLB value of less than 4 or a molecular weight of up to 1,200 daltons or both; and
    c) a delamination-resistant bond between the silicone elastomer layer and the hydrogel layer, wherein the delamination-resistant bond is formed by the elastomer-swellable monomer.

2. The hybrid contact lens of claim 1, wherein the elastomer-swellable monomer is capable of swelling the silicone elastomer by at least 10% as determined by submerging an 11.5 mm×100 disk of the silicone elastomer in the elastomer-swellable monomer for 24 hours at 20-25° C. and measuring at least a 10% change in diameter of the disk.

3. The hybrid contact lens of claim 1, wherein the elastomer-swellable monomer has an HLB value of 0 to less than 4.

4. The hybrid contact lens of claim 1, wherein the elastomer-swellable monomer has a molecular weight of up to 1,200 daltons.

5. The hybrid contact lens of claim 1, wherein the hydrogel layer is a silicone hydrogel.

6. The hybrid contact lens of claim 1, wherein the hydrogel layer is a siloxane-free hydrogel.

7. The hybrid contact lens of claim 6, wherein the hydrogel layer comprises a copolymer of 2-hydroxyethyl methacrylate (HEMA) and methyl methacrylate (MMA).

8. The hybrid contact lens of claim 7, wherein the copolymer is formed by curing a polymerization composition comprising at least 20 wt. % MMA.

9. The hybrid contact lens of claim 1, wherein the bond comprises an interpenetrating polymer network formed by the elastomer-swellable monomer.

10. The hybrid contact lens of claim 1, wherein the bond comprises a covalent attachment between a vinyl-functionalized component of the hydrogel layer and the silicone elastomer layer.

11. The hybrid contact lens of claim 10, wherein the vinyl-functionalized component comprises a divinyl siloxane.

12. The hybrid contact lens of claim 1, wherein the hydrogel layer has a chord diameter that is 3 to 8 mm larger than that of the silicone elastomer layer.

13. The hybrid contact lens of claim 1, wherein the silicone elastomer layer forms the anterior surface of the contact lens and is treated to provide a hydrophilic surface.

14. The hybrid contact lens of claim 13, wherein the silicone elastomer layer is treated with plasma or a hydrophilic coating.

15. The hybrid contact lens of claim 1, further comprising an object embedded within the silicone elastomer layer or adhered to the anterior side of the silicone elastomer layer.

16. The hybrid contact lens of claim 15, wherein the object is a variable focus lens.

17. The hybrid contact lens of claim 15, wherein the object is an electronic component.

18. A method of manufacturing an elastomer-hydrogel hybrid contact lens comprising:
    a) providing a silicone elastomer layer comprising an anterior side and a posterior side;
    b) contacting a polymerizable hydrogel composition with the posterior side of the silicone elastomer layer, wherein the polymerizable hydrogel composition comprises an elastomer-swellable monomer having an HLB value of less than 4 or a molecular weight of up to 1,200 daltons or both; and
    c) curing the hydrogel composition to form a hydrogel layer adhered to the posterior side of the silicone elastomer layer and a delamination-resistant bond between the silicone elastomer layer and the hydrogel layer, wherein the delamination-resistant bond is formed by the elastomer-swellable monomer.

19. The method of claim 18, further comprising hydrating the hydrogel layer.

20. The method of claim 18, further comprising sealing the hybrid contact lens in a package.

21. The method of claim 18, wherein the polymerizable hydrogel composition comprises a divinyl siloxane and a platinum catalyst.

22. The method of claim 18, wherein the silicone elastomer layer is formed by a method comprising:
   dispensing an amount of a liquid silicone elastomer into a first mold member defining an anterior surface of the silicone elastomer layer;
   coupling a second mold member defining a posterior surface of the silicone elastomer to the first mold member to form a first mold assembly; and
   subjecting the first mold assembly to conditions that cause the silicone elastomer to cure.

23. The method of claim 22, further comprising:
   decoupling the first and second mold members so that the silicone elastomer layer is retained by the first mold member,
   wherein the polymerizable hydrogel composition is contacted with the posterior side of the silicone elastomer layer while it is retained by the first mold member, and wherein a third mold member defining a posterior surface of the hydrogel layer is coupled to the first mold member to form a second mold assembly.

24. The hybrid contact lens of claim 1, wherein the hydrogel layer has an equilibrium water content of about 20 wt. % to about 60 wt. %.

* * * * *